US012600049B2

(12) United States Patent
Zografos et al.

(10) Patent No.: US 12,600,049 B2
(45) Date of Patent: Apr. 14, 2026

(54) RAZOR CARTRIDGE

(71) Applicant: BIC VIOLEX S.A., Anoixi (GR)

(72) Inventors: Georgios Zografos, Anoixi (GR); Ioanna Preza, Anoixi (GR); Thomas Brette, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 496 days.

(21) Appl. No.: 17/615,968

(22) PCT Filed: Jul. 30, 2020

(86) PCT No.: PCT/EP2020/071490

§ 371 (c)(1),
(2) Date: Dec. 2, 2021

(87) PCT Pub. No.: WO2021/019006

PCT Pub. Date: Feb. 4, 2021

(65) Prior Publication Data

US 2022/0314476 A1 Oct. 6, 2022

(30) Foreign Application Priority Data

Jul. 31, 2019 (EP) .................................... 19189465

(51) Int. Cl.

| | |
|---|---|
| ***B26B 21/40*** | (2006.01) |
| ***B26B 21/22*** | (2006.01) |
| ***B26B 21/56*** | (2006.01) |

(52) U.S. Cl.

CPC ........ *B26B 21/4031* (2013.01); *B26B 21/227* (2013.01); *B26B 21/565* (2013.01)

(58) Field of Classification Search

CPC .......... B26B 21/4031; B26B 21/44012; B26B 21/227; B26B 21/222; B26B 21/565;

(Continued)

(56) References Cited

U.S. PATENT DOCUMENTS

| | | | | |
|---|---|---|---|---|
| 10,562,198 B2 * | 2/2020 | Clarke | .................... | A01M 1/00 |
| 10,780,595 B2 * | 9/2020 | Lin | ....................... | B26B 21/565 |

(Continued)

FOREIGN PATENT DOCUMENTS

| | | |
|---|---|---|
| CN | 104507647 A | 4/2015 |
| CN | 105358294 A | 2/2016 |

(Continued)

OTHER PUBLICATIONS

JP-2013099467-A English translation; May 23, 2013; Sawai Shinji.*

(Continued)

*Primary Examiner* — Laura M Lee

(74) *Attorney, Agent, or Firm* — Bookoff McAndrews, PLLC

(57) ABSTRACT

A razor cartridge comprising: a housing extending longitudinally along a longitudinal axis, wherein the housing comprises a leading longitudinal side, a trailing longitudinal side, and a recess in between the leading and trailing longitudinal sides for accommodating a group of cutting members, and a group of cutting members comprising a plurality of cutting members disposed at least partially in the recess, wherein each cutting member is arranged between a leading longitudinal side and a trailing longitudinal side of the recess in a shaving direction of the razor cartridge. A first cutting member of the group of cutting members comprises a first blade support having a first blade mounting portion disposed on an inner surface of the first blade support that, in use, faces away from a shaving plane, and a first blade attached to the first blade mounting portion.

18 Claims, 9 Drawing Sheets

(58) Field of Classification Search
CPC . B26B 21/4018; B26B 21/225; B26B 21/443; B26B 21/4068
USPC .......................................................... 30/34.2, 50
See application file for complete search history.

(56) References Cited

U.S. PATENT DOCUMENTS

| | | | | |
|---|---|---|---|---|
| 11,000,960 | B1 * | 5/2021 | Hooberman | B26B 21/4031 |
| 11,077,570 | B2 * | 8/2021 | Dryfhout | B26B 21/4006 |
| 2006/0277759 | A1 | 12/2006 | Follo | |
| 2014/0026424 | A1 * | 1/2014 | Oglesby | B26B 21/4031 30/50 |
| 2022/0118635 | A1 * | 4/2022 | Bozikis | B26B 21/565 |
| 2022/0152854 | A1 * | 5/2022 | Hooberman | B26B 21/4031 |

FOREIGN PATENT DOCUMENTS

| | | | | | |
|---|---|---|---|---|---|
| EP | 2707180 | B1 | * | 12/2016 | B26B 21/4012 |
| JP | 2013099467 | A | * | 5/2013 | B26B 21/565 |
| JP | 2015100621 | A | * | 6/2015 | B26B 21/521 |
| WO | 2006027018 | A1 | | 3/2006 | |
| WO | 2012158141 | A1 | | 11/2012 | |
| WO | 2017161341 | A1 | | 9/2017 | |

OTHER PUBLICATIONS

JP-2015100621-A English translation; Jun. 4, 2015; Furuta Shigenari.*
Office Action issued in corresponding Chinese Application No. 202080033795 mailed on Mar. 24, 2023.
International Search Report and Written Opinion in International Application No. PCT/EP2020/071490, dated Nov. 25, 2020 (9 pages).

* cited by examiner

RAZOR CARTRIDGE

This application is a National Stage application of International Application No. PCT/EP2020/071490, filed on 30 Jul. 2020, now published as WO2021019006 and which claims benefit from European patent application EP19189465.8, filed on 31 Jul. 2019, the entire contents being incorporated herein by reference.

TECHNICAL FIELD

The embodiments described in the following disclosure relate to a razor cartridge, a method for manufacturing a razor cartridge, a shaving razor assembly and an associated kit of parts.

BACKGROUND

Razor cartridges (also known as safety razor cartridges) are permanently or removably attached to a razor handle that, in use, is oriented in shaving direction. Razor cartridges typically comprise one or more cutting members, each supporting a blade, mounted perpendicular to the shaving direction. Razor cartridges are also typically provided with a guard (at a leading longitudinal side of the razor cartridge in the shaving direction) and a cap (at a trailing longitudinal side of the razor cartridge in the shaving direction). In use, a user holds the razor handle in the shaving direction and brings the razor cartridge into contact with a portion of skin defining a cutting edge plane.

Typically, the cutting edge plane is defined as the plane intersecting the first and second skin contact areas of, for example, cutting edges of the shaving head. Movement of the razor handle by the user during shaving operation causes the blades of the razor cartridge to be moved across the cutting edge plane in the shaving direction, enabling the blades to remove unwanted hair. Movement of the razor handle causes the blades of the razor cartridge to be moved across the shaving plane in the shaving direction, enabling the blades to remove unwanted hair.

The performance of razor cartridges may be further improved.

SUMMARY

According to a first aspect, a razor cartridge is provided. The razor cartridge comprises:

- a housing extending longitudinally along a longitudinal axis, wherein the housing comprises a leading longitudinal side, a trailing longitudinal side, and a recess in between the leading and trailing longitudinal sides for accommodating a plurality of cutting members, and
- a group of cutting members comprising the plurality of cutting members disposed at least partially in the recess, wherein each cutting member is arranged between a leading longitudinal side and a trailing longitudinal side of the recess in a shaving direction of the razor cartridge.

The first cutting member of the group of cutting members comprises a first blade support having a first blade mounting portion disposed on an inner surface of the first blade support that, in use, faces away from a shaving plane, and a first blade attached to the first blade mounting portion.

The second cutting member of the group of cutting members comprises a second blade support having a second blade mounting portion disposed on an outer surface of the second blade support that, in use, faces towards a shaving plane, and a second blade attached to the second blade mounting portion.

According to a second aspect, there is provided a method of manufacturing a razor cartridge comprising:

- obtaining a housing extending longitudinally along a longitudinal axis, wherein the housing comprises a leading longitudinal side, a trailing longitudinal side, and a recess in between the leading and trailing longitudinal sides for accommodating a group of cutting members;
- providing a first cutting member in the recess, wherein a first cutting member of the group of cutting members comprises a first blade support having a blade mounting portion disposed on an inner surface of the first blade support that, in use, faces away from a shaving plane, and a blade attached to the first blade mounting portion; and
- providing a second cutting member in the recess, wherein the second cutting member of the group of cutting members comprises a second blade support having a second blade mounting portion disposed on an outer surface of the second blade support that, in use, faces towards a shaving plane, and a second blade attached to the second blade mounting portion, thereby providing a group of cutting members disposed at least partially in the recess, wherein each cutting member is arranged between a leading longitudinal side and a trailing longitudinal side of the recess in a shaving direction of the razor cartridge.

According to a third aspect, there is provided a shaving razor assembly comprising: a razor handle, and a razor cartridge according to the first aspect. The razor cartridge is either releasably attached to the razor handle via a pivotable or non-pivotable connection, integrally formed with the razor handle via a non-pivotable connection, or integrally formed with the razor handle via a pivotable connection.

According to a fourth aspect, there is provided a kit of parts comprising a razor handle and a razor cartridge holder comprising a plurality of razor cartridges razor cartridge according to the first aspect.

An effect of a razor cartridge according to the first aspect is that the phenomenon of skin bulge between cutting members having blades attached to a blade mounting portion that faces away from a shaving plane is reduced.

The first cutting member has two skin contact points with the shaving plane when the razor cartridge is in contact with the skin of a user. The first skin contact point of the first cutting member is the cutting edge of the blade attached to the mounting portion that faces away from the shaving plane.

The additional skin contact point is provided by the blade support. This additional skin contact point provided by a first blade that is mounted closer to the leading longitudinal side of the razor cartridge equalizes the distribution of the drag forces exerted by the skin against a cutting edge plane of the razor cartridge, and thus mitigates irritation, nicks, and cuts during shaving.

Further, the bulging between cutting edges is reduced because the additional skin contact point provided with each cutting member having a blade support with a blade mounting portion facing away from the shaving plane provides more area for the skin to be supported during shaving operation. Also, the provision of additional skin contact points provides for intermediate contact points in between the inter-blade span (i.e. the cutting edges of consecutive blades)

A further effect is that because the second cutting member is mounted closer towards the trailing edge of the razor cartridge and is mounted on a blade mounting portion that in use faces towards the shaving plane, the second cutting member has only one contact point with the cutting edge plane. The contact point of the second cutting member with the cutting edge plane is the cutting edge of the blade mounted on the second cutting member. Therefore, the second cutting member can provide a closer cutting action, to ensure that hair remainders that were not removed by at least the first cutting member mounted closer to the leading longitudinal side are cut off subsequently by the second cutting member. This closer shave leads to a more effective her cutting action whilst reducing the amount of irritation, nicks, and cuts experienced during shaving.

Another effect is that a smoother and more convenient shaving action is provided by the razor cartridge, because blades towards the leading longitudinal side of the razor cartridge contribute more to the cutting operation.

Another effect is that durability of the blades closer to the leading longitudinal side of the razor cartridge is enhanced, because due to the provision of the additional skin contact points these blades exert less pressure on the skin thus resulting in a less aggressive shave and a lower rate of blade wear. The blades closer to the leading longitudinal side therefore have a lifetime comparable to the blades closer to the trailing longitudinal side of the razor cartridge although typically they are the ones that get dull more easily. A user must dispose of a razor cartridge even when one blade of a group of blades becomes blunted. Previously, a user would dispose of a razor cartridge having blunt blades closer to the leading longitudinal side even if the blades closer to the trailing longitudinal side of the razor cartridge were acceptably sharp. According to the present aspects, the wear rate on the blades closer to the trailing longitudinal side of the razor cartridge and the leading longitudinal side of the razor cartridge is more equal.

The present razor cartridge may in particular be more suited to infrequent razor users who wait several days between shaving. Such behavior leads to a requirement for a greater degree of hair removal compared to the case of a user who shaves daily. A razor cartridge according to the present disclosure is better adapted to e.g. users who shave less frequently, because the wear rate of blades at the leading longitudinal edge of the razor cartridge can be equalized with the wear rate of blades at the trailing longitudinal edge of the razor cartridge to accommodate the denser and/or longer hair clippings characteristic of users who shave less frequently.

A cutting edge plane is defined as the plane intersecting the first and second skin contact areas of, for example, cutting edges of the shaving head (in a two-dimensional cut-through, the cutting edge plane would be a line intersecting the cutting edges of the blades).

A shaving plane is typically defined by the most prominent members of the housing of a razor cartridge. For example, the shaving plane is defined as the plane between a guard member and a cap member that contact a user, in use. The shaving plane represents the theoretical position of the surface being shaved. Based on that, an exposure (of the cutting edge plane with respect to the shaving plane) can be designated as negative, neutral or positive. A neutral exposure defines that the cutting edge plane is substantially coplanar with the shaving plane. A negative exposure implies that the cutting edge plane is nearer to the base support member of the razor cartridge than the shaving plane or below the shaving plane. A positive exposure implies that the cutting edge plane is further from the base support member compared to the shaving plane or above the shaving plane.

As will be described in this specification, the razor cartridge comprises at least two different types of cutting member. One type of cutting member comprises blades mounted below their blade supports support, as defined and illustrated subsequently. In this case, a local exposure is designated as the vertical distance between a cutting edge and a support plane, wherein the support plane is defined by a tangential line intersecting the tips of the blade supports.

Further embodiments are presented in the dependent claims, and the detailed description, to which the reader should now refer.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
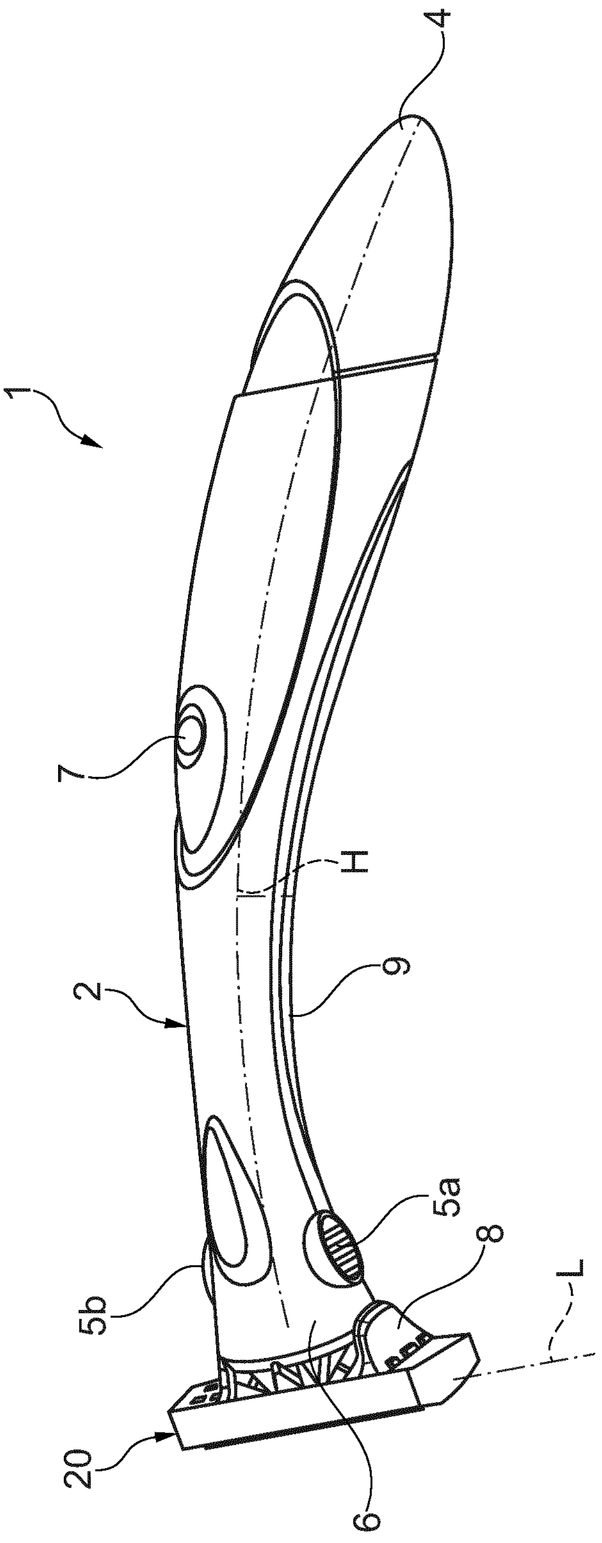
FIG. 1 is a perspective view of a shaving razor assembly according to an aspect.

FIG. 1 is a perspective view of a shaving razor assembly 1 according to an aspect. The shaving razor assembly comprises blades which are not driven by a motor. The shaving razor assembly 1 comprises a handle 2 extending in a handle direction H between a proximal portion 4 and a distal portion 6 of the handle 2. A razor cartridge 20 is mounted at the distal portion 6 of the handle 2. The razor cartridge 20 will be presented in more detail following discussion of the shaving razor assembly 1.

The mounting of the razor cartridge 20 to the distal portion 6 of the handle 2 in the illustration is via a pivotable bearing member 8 enabling a frame of reference of the handle 2 to vary relative to a frame of reference of the razor cartridge 20, to thus enable the angle of the razor cartridge against the skin of a user to vary and adapt to changes during use.

In particular, the razor cartridge 20 pivots relative to the handle 2 about the longitudinal axis L of the razor cartridge 20, in use. The pivoting enables the user to adapt to contours of the body, for example. The longitudinal axis L of the razor cartridge 20 is substantially perpendicular to the shaving direction along the handle 2. Another example of a connection mechanism for connecting the razor cartridge 20 to the handle 2 is discussed in WO2006/027018 A1. Another alternative is a razor cartridge 20 that may pivot relative to a second pivot axis (a rocking axis), substantially perpendicular to axis L.

In examples, the pivotable bearing member 8 may be omitted (not illustrated) and the handle 2 provided as an integrally connected part of the support of the razor cartridge 20.

In an example, the pivotable bearing member 8 may further comprise, or be replaced by, a release mechanism 5*a*, 5*b*, enabling rapid release of an exhausted razor cartridge from the handle 2.

In an example, the handle 2 and the support of the razor cartridge 20 are integrally formed with a pivotable bearing member (not illustrated) such as a plastic spring member.

In an example, the handle 2 is provided with a handle grip 9 formed of a rubber, or rubber-like material to improve gripping friction. In an example, the handle is provided with a thumb-rest 7 to enable a more secure grip of the handle 2 by a user.

Figure 2A:
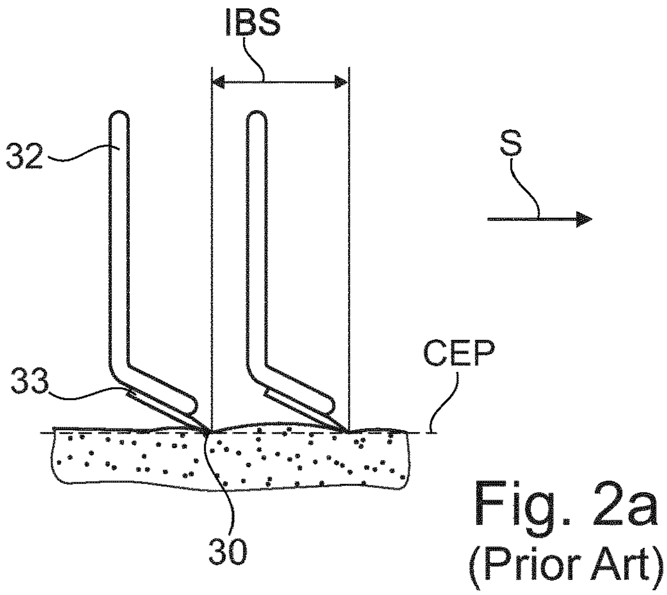
Fig. 2a (Prior Art)
FIGS. 2*a* and 2*b* schematically illustrate side views of a portion of a prior art razor cartridge in use.
Figure 2B:
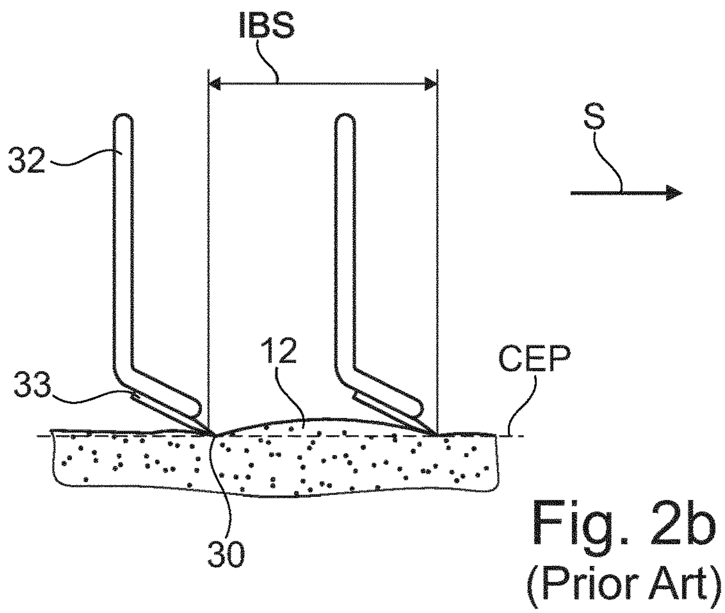
Fig. 2b (Prior Art)

FIGS. 2*a* and 2*b* are schematic side views of a portion of a prior art razor cartridge in use. In conventional razor cartridges with three or more blades, the inter-blade span is measured to be constant in a range of about 1.05 mm to 1.5 mm, and the razor blade is mounted on the top of the blade support.

The phrase "top of the blade support" for the purposes of this specification means a side of a blade support of a razor cartridge that is closest to a shaving plane SH (skin) of a user when the razor cartridge is in use, as illustrated in FIGS. 2*a* and 2*b*. When a razor cartridge with such top-mounted cutting members is used, aggressive shaving may result in an increased degree of nicks and cuts and an increased sense of irritation, because the shaving plane SH (skin) is exclusively supported by the cutting edges 30 of the blades on the blade support, wherein the cutting edges lie in a cutting edge plane CEP. This provides the skin with a relatively small surface to be supported on during shaving, and causes an increased degree of "bulging" 12 of the shaving plane SH (skin) between the inter-blade gaps.

The wear rate of top-mounted cutting members near to the front of the prior art razor cartridge (meeting a hair to be cut first) may be higher than the wear rate of top-mounted cutting members near to the rear of the prior art razor cartridge.

Figure 3:
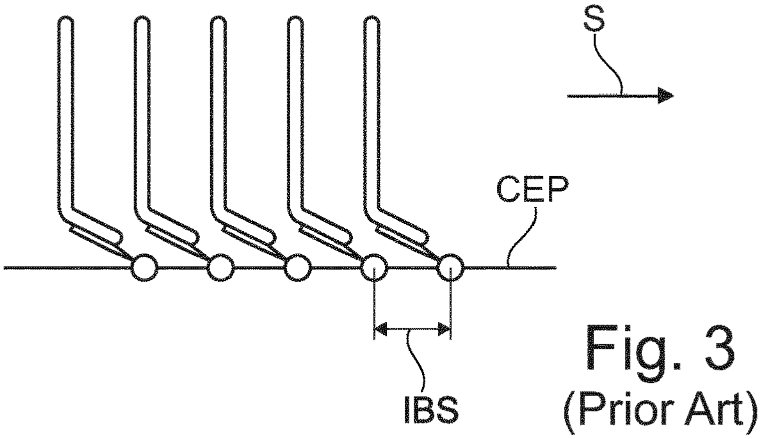
Fig. 3 (Prior Art)
FIG. 3 is a schematic side view of a portion of a prior art razor cartridge in use.

FIG. 3 is a schematic side view of a portion of a prior art razor cartridge in use. To reduce the effect of skin bulging 12, the inter-blade span IBS can be reduced, as illustrated in FIG. 3. However, this results in a reduced gap for rinsing, and debris such as foam or hair can easily block a gap having a narrow inter-blade span. A greater blade density (number of blades in the same-sized cartridge) is also required when the IBS between all blades is reduced.

Therefore, conventional razor cartridges can be further improved.

According to a first aspect, there is provided a razor cartridge 20 comprising a housing 21 extending longitudinally along a longitudinal axis x, wherein the housing comprises a leading longitudinal side 24, a trailing longitudinal side 25, and a recess 19 in between the leading 24 and trailing longitudinal sides 25 for accommodating a group of cutting members; and a group 29 of cutting members comprising a plurality of cutting members 28*a*-28*d* disposed at least partially in the recess 19, wherein each cutting member 28*a*-28*d* is arranged in between a leading longitudinal side and a trailing longitudinal side of the recess 19 in a shaving direction S of the razor cartridge.

A first cutting member 28*a* of the group of cutting members 29 comprises a first blade support 32 having a first blade mounting portion disposed on an inner surface of the first blade support that, in use, faces away from a shaving plane SH, and a first blade attached to the first blade mounting portion.

A second cutting member of the group of cutting members comprises a second blade support having a second blade mounting portion disposed on an outer surface of the second blade support that, in use, faces towards a shaving plane SH, and a second blade attached to the second blade mounting portion.

Figure 4:
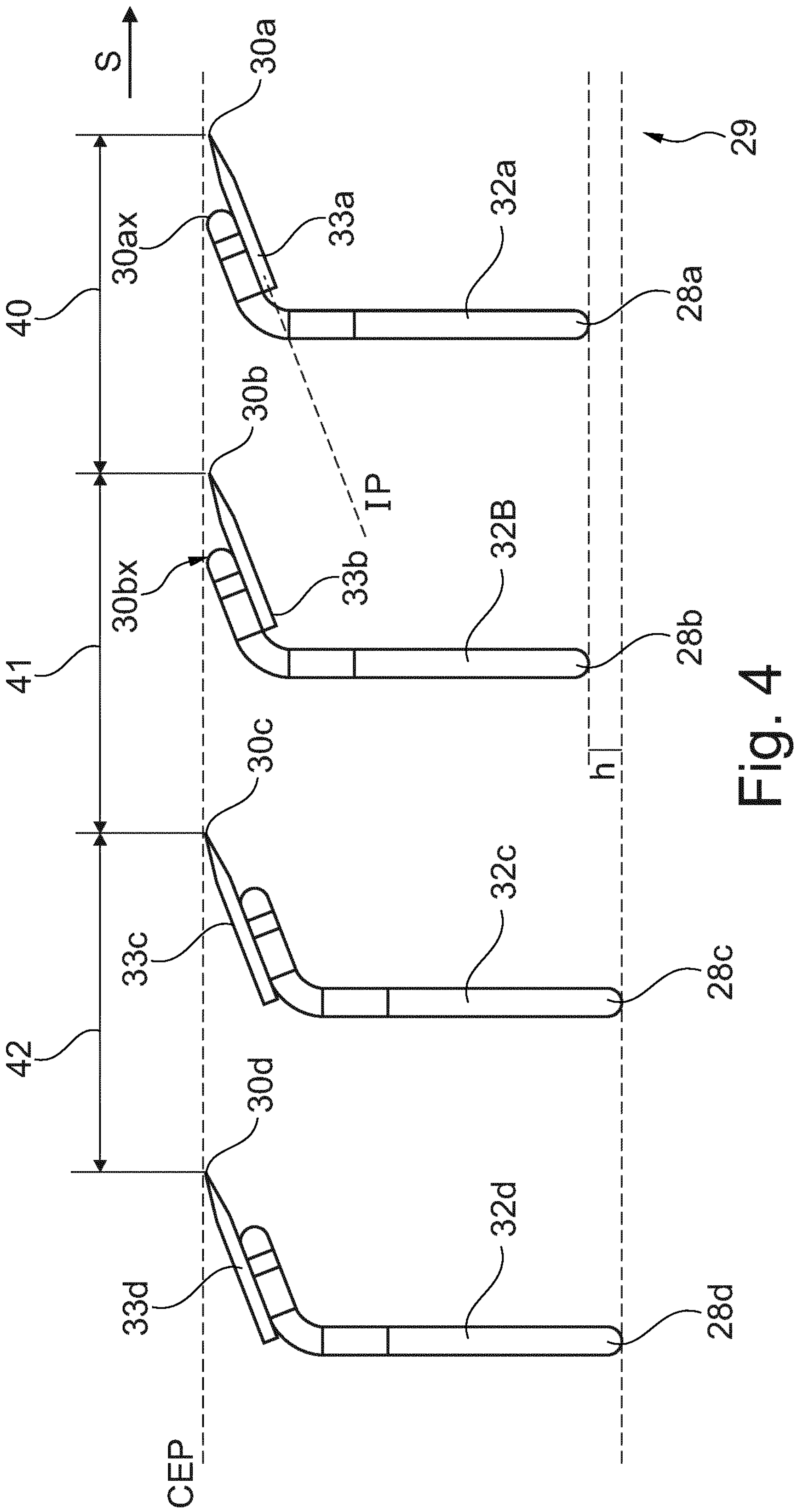
FIG. 4 illustrates schematic side views of four razor blades of a razor cartridge according to an embodiment.

FIG. 4 illustrates a schematic side view of four cutting members 28*a*-28*d* of a group of cutting members 29 to illustrate the general concept discussed in this specification according to an embodiment with four cutting members 28*a-d*. The surrounding structure of a razor cartridge 20 is not illustrated as an aid to clarity.

The group of cutting members 29 are, in use, drawn across the skin of the user so that the skin is contacted by the cutting edge plane (approximated by the shaving plane SH) in the shaving direction S. The cutting members 28*a*-28*d* of the group of cutting members 29 are not homogeneous. In other words, the at least one cutting member in the group of cutting members has a different design compared to the others.

In general terms, the first two cutting members 28*a* and 28*b* comprise blades 33*a* and 33*b* mounted below their respective blade supports 32*a* and 32*b*, with respect to the cutting edge plane CEP. The second two cutting members 28*c* and 28*d* comprise blades 33*c* and 33*d* mounted above their respective blade supports 32*c* and 32*d*, with respect to the cutting edge plane CEP.

The designation that a blade 33*c* and 33*d* is "mounted above" a blade support means that a second blade mounting portion is disposed on an outer surface of the first blade support 32*a* that, in use, faces towards a shaving plane SH, and the first blade 33*a* is attached to the second blade mounting portion.

In other words, a blade 33*c* that is "mounted above" its blade support 32*c* defines an imaginary plane that (i) intersects with the cutting edge plane CEP at the cutting edge 30*c*, and the same imaginary plane (ii) does not pass through (interfere with) any portion of the support member 28*c* to which the same blade 33*c* is attached.

The designation that a blade 33*a,b* is "mounted below" a blade support means that a first blade mounting portion is disposed on an inner surface of the first blade support 32*a* that, in use, faces away from a shaving plane SH (the cutting member is disposed such that in use faces away a shaving surface, for example the skin), and the first blade 33*a* is attached to the first blade mounting portion. This may alternatively be referred to as a hanging blade.

In other words, a blade 33*a* that is "mounted below" its blade support 32*a* defines an imaginary plane that (i) intersects with the cutting edge plane CEP at the cutting edge 30*a*, and the same imaginary plane (ii) must pass through (interfere with) a portion of the support member 28*a* to which the same blade 33*a* is attached. In the illustration of FIG. 4, an example of an imaginary plane interfering with a portion of the support member 28*a* is illustrated by the dotted extended line IP. The line crosses through the support member 28*a*. A similar extension of plane defined by blade 33*c* would not cross through the support member 28*c*.

In FIG. 4, cutting members 28*a* and 28*b* comprise blades 33*a* and 33*b* that are mounted below their blade supports 32*a* and 32*b*, respectively.

In FIG. 4, cutting members 28*c* and 28*d* comprise blades 33*c* and 33*d* that are mounted below their blade supports 32*c* and 32*d*, respectively.

In use, cutting member 28*a* has two points of contact with a portion of skin against the cutting edge plane CEP. The first point of contact with the cutting edge plane CEP is the cutting edge 30*a*. The second point of contact with the cutting edge plane CEP is the front edge 30*ax* of the cutting member 28*a*. Cutting member 28*b* similarly comprises two points of contact with the cutting edge plane CEP; the cutting edge 30*b* and the front edge 30*bx* of the cutting member 28*b*.

In use, cutting member 28*c* has one point of contact with the cutting edge plane CEP—the cutting edge 30*c*. The cutting member 28*d* has one point of contact with the cutting edge plane CEP in use—the cutting edge 30*d*.

In examples, the blade supports 32*a* and 32*b* may be the same type (for example, dimensions and material thickness) as the blade supports 32*c* and 32*d*, to reduce the bill of material cost. In this case, the blade supports 32*a* and 32*b* (comprising two cutting edge plane CEP contact areas) may be mounted at a height deviation h above the mounting height of the blade supports 32*c* and 32*d* (comprising one cutting edge plane CEP contact area), in order to ensure that the cutting edges 30*a* and 30*b* are coplanar with the cutting edges 30*c* and 30*d*.

In examples, the blade supports 32*a* and 32*b* may be of a different type, for example longer than the blade supports 32*c* and 32*d* so that the cutting edges 30*a*-30*d* are coplanar without requiring blade supports 32*a* and 32*b* to be mounted with a height deviation h.

A leading inter-blade span 40 is the span that is perpendicular to, and spanning, the first and second cutting edges in the cutting edge plane CEP between cutting-edge 30*a* and 30*b*. A first intermediate inter blade span 41 is the span that is perpendicular to, and spanning, the second and third cutting edges in the cutting edge plane CEP between cutting-edge 30*b* and 30*c*. A trailing inter-blade span 42 is, in the example of FIG. 4, the span the span that is perpendicular to, and spanning, the second and third cutting edges in the cutting edge plane CEP between cutting-edge 30*c* and 30*d*.

In examples, the leading inter-blade span 40, the first intermediate inter-blade span 41, and the trailing inter-blade span 42 are substantially equal.

In examples, the leading inter-blade span 40 is greater than the first intermediate inter-blade span 41.

In examples, the leading inter-blade span 40 is greater than the first intermediate inter-blade span 41, and the first intermediate inter-blade span 41 is greater than the trailing inter-blade span 42.

In examples, the leading inter-blade span 40 is less than the first intermediate inter-blade span 41.

In examples, the leading inter-blade span 40 is less than the first intermediate inter-blade span 41, and the first intermediate inter-blade span 41 is less than the trailing inter-blade span 42.

According to embodiments, the first cutting member 28*a* and the second cutting member 28*b* (the cutting members 28 comprising blades 33 held underneath the blade supports 32) are comprised in a first subset of the group of cutting members 29.

According to embodiments, the third cutting member 28*c* and the fourth cutting member 28*d* (the cutting members 28 comprising blades 33 held above the blade supports 32) are comprised in a second subset of the group of cutting members 29.

It can therefore be seen that, according to embodiments, a group of cutting members 29 is provided, wherein in use, an integer number of skin contact points of cutting members comprised within the group of cutting members is at least one greater than a total integer number of cutting members comprised within the group of cutting members, and at least one fewer than two times the total integer number of cutting members comprised within the group of cutting members.

Alternatively or in addition, the “skin contact point” may be considered to be a “skin contact area”. A “skin contact area” means a part of the arrangement of cutting members 28 that comes into contact with the skin of a user of the razor cartridge in normal use. Of course, many parts of the housing, guard, and cap element will also contact the skin of a user during normal use of the razor cartridge, but the term “skin contact area” means the section of a cutting edge 33*a-f* of one of the blades of the razor cartridge 20, or the section of the edge of the blade support 30*ax* that contact the skin of a user in normal use. Therefore, when a plurality of cutting members 28*a*-28*f* is provided, there will be a plurality of skin contact areas in normal use. A subset 28*a*, 28*b* of the cutting members provided may contact the skin at both a cutting edge 33*a*, 33*b* and a front edge of the blade support. Therefore, it is not essential that every skin contact area functions to cut a hair of the user. The skin contact areas provided by the front edge of the blade supports 30*ax*, 30*bx* function to provide support to the skin surface such that the overall pressure on the skin at the cutting edges 33*a*, 33*b* is reduced. Viewed alternatively, the skin contact areas provided by the front edge of the blade supports 30*ax*, 30*bx* functions to reduce an inter-blade span, to thus reduce the size of skin bulges. In an example, the skin contact portions 30*ax*, 30*bx* of the blade supports 32*a*, 32*b* are rounded or chamfered to improve glideness properties of the cutting members 28*a*, 28*b*.

In other words, each of the blade supports of cutting members in the first subset of the group of cutting members comprises a cutting edge plane CEP contact portion that is configured, in use, to contact the cutting edge plane CEP in addition to the cutting edge or edges of the blade or blades, thereby reducing the pressure at cutting edge contact points with the skin at the cutting edge plane CEP.

Figure 5:
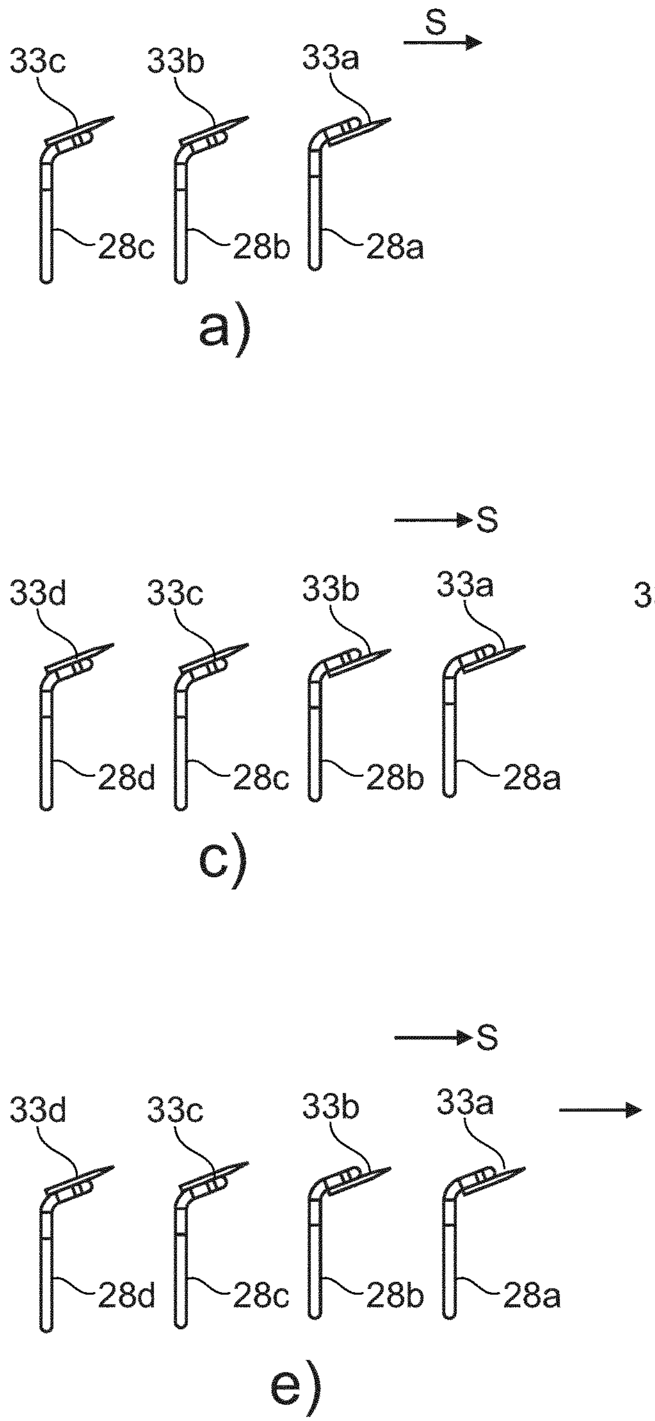
FIG. 5 schematically illustrates different examples for mounting the razor blades.

FIG. 5 schematically illustrates different embodiments for mounting the cutting members comprised in the group of cutting members 29.

FIG. 5*a* schematically illustrates a group of three cutting members 29 comprising a leading cutting member 28*a* having a blade 33*a* facing away from the shaving plane SH, and two trailing cutting members 28*b*, 28*c* having blades 33*b*, 33*c* facing towards the shaving plane SH.

FIG. 5*b* schematically illustrates a group of three cutting members 29 comprising a leading cutting member 28*a* and intermediate cutting member 28*b* having blades 33*a* and 33*b* facing away from the shaving plane SH, and a trailing cutting members 28*c* having blade 33*c* facing towards the shaving plane SH.

FIG. 5*c* schematically illustrates a group of four cutting members 29 comprising a leading cutting member 28*a* having a blade 33*a* facing away from the shaving plane SH, and three trailing cutting members 28*b*, 28*c*, 28*d* having blades 33*b*, 33*c*, 33*d* facing towards the shaving plane SH.

FIG. 5*d* schematically illustrates a group of four cutting members 29 comprising a leading cutting member 28*a* and a first trailing cutting member 28*b* having blades 33*a* and 33*b* facing away from the shaving plane SH, and two trailing cutting members 28*c*, 28*d* having blades 33*c*, 33*d* facing towards the shaving plane SH.

FIG. 5*e* schematically illustrates a group of four cutting members 29 comprising a leading cutting member 28*a* and two trailing cutting members 28*b*, 28*c* having blades 33*b*, 33*c* facing away from the shaving plane SH, and one trailing cutting member 28*d* having blades 33*d* facing towards the shaving plane SH.

Of course, further alternative permutations are possible, such as those comprising five or six blades.

In embodiments, the first subset of the group of cutting members 29 comprises two consecutive cutting members, each cutting member comprising a blade support having a blade mounting portion disposed on an inner surface of the blade support that, in use, faces away from the shaving plane and a blade attached to the blade mounting portion.

In embodiments, the first subset of the group of cutting members 29 comprises three consecutive cutting members, each cutting member comprising a blade support having a blade mounting portion disposed on an inner surface of the blade support that, in use, faces away from the shaving plane and a blade attached to the blade mounting portion. In embodiments, the second subset of the group of cutting members 29 comprises two consecutive cutting members, each cutting member comprising a blade support having a blade mounting portion on an outer surface of the blade support that, in use, faces towards the shaving plane and a blade attached to the blade mounting portion. In embodiments, the second subset of the group of cutting members 29 comprises three consecutive cutting members, each cutting member comprising a blade support having a blade mounting portion on an outer surface of the blade support that, in use, faces towards the shaving plane and a blade attached to the blade mounting portion.

Having introduced the concept of a group of cutting members with a combination of blades mounted above and below their respective supports, the mounting of the cutting members in a razor cartridge will now be discussed.

Figure 6:
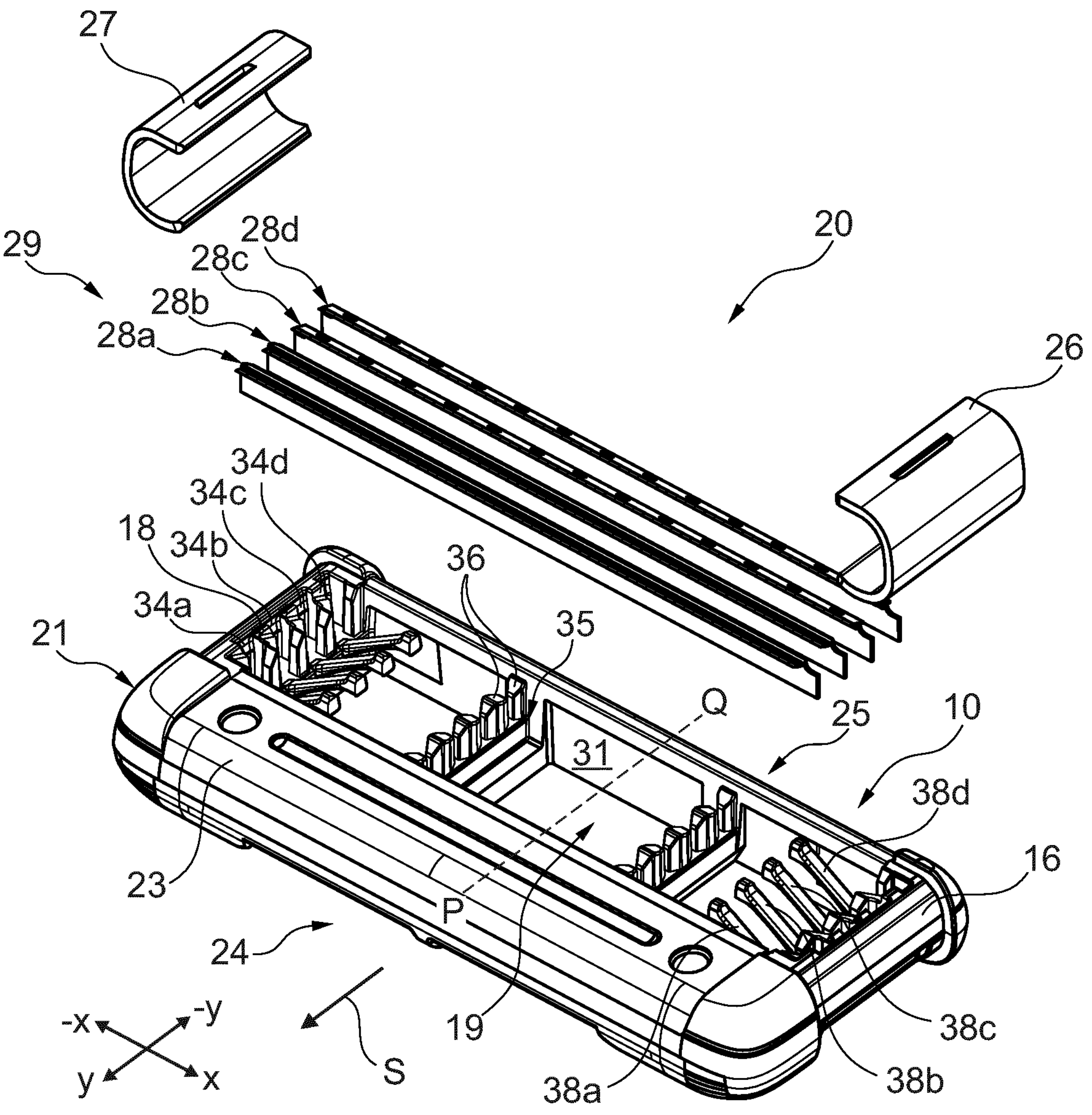
FIG. 6 is a perspective partial exploded view of a razor cartridge according to an embodiment.

FIG. 6 is a perspective partial exploded view of a razor cartridge 20 according to an embodiment of the first aspect. "Partial exploded view" means that some minor components of the razor cartridge 20 have been omitted from the exploded view to aid clarity of the drawing.

The shaving direction S is depicted in FIG. 6 using arrow S. In use, the cutting edge plane CEP of the razor cartridge 20 contacts the skin of a user, and is translated across the skin of the user in the direction of arrow S.

In the example, the housing comprises a housing 21 fabricated partially or completely of synthetic materials, such as plastic, resin, or elastomers. In embodiments, the housing is integrally formed. In embodiments, the housing is formed from a plurality of sub-assemblies that are joined together by joining methods such as adhesive bonding, interference fitting, or ultrasonic or thermal welding, for example.

The housing 21 comprises a platform member (not shown) connectable to a handle 2 (for example, as shown in FIG. 1) of a shaving razor assembly 1 either integrally, or by a connection mechanism such as a pivotable bearing member 8 or by an interconnecting member (not shown).

In the example, a guard member 23 is provided on the leading longitudinal edge of the razor cartridge 20. In use, the guard member 23 is the first portion of the razor cartridge 20 to contact uncut hairs. The side of the razor cartridge 20 opposite to the leading longitudinal side of the razor cartridge 20 and opposite to the shaving direction is the trailing longitudinal side 25 of the razor cartridge 20. The trailing longitudinal side 25 is thus the final portion of the razor cartridge 20 to contact the shaving plane SH, in use.

It will be noted that the terms "leading longitudinal side 24" and "trailing longitudinal side 25" are used to label specific locations on the razor cartridge 20, and do not imply or require the absence or presence of a particular feature. For example, a guard member 23 may in one example be located at the "leading longitudinal side 24" but it is not essential that this location comprises such a feature.

The guard member 23, in an example, comprises an elastomeric member (not shown in FIG. 6). In an example, the elastomeric layer comprises one or more fins extending longitudinally in parallel to the guard member 23 and substantially perpendicularly to the shaving direction. One purpose of such an elastomeric layer is, for example, to tension the skin prior to cutting.

The razor cartridge 20 further comprises a group of cutting members 29 accommodated in a blade receiving section 31 of the housing 21. The group of cutting members 29 comprises a plurality of cutting members 28*a-d*. The group of cutting members 29 is disposed in the housing 21 longitudinally and parallel to the shaving direction SH such that in use, blades of the cutting members 28*a-d* contact the cutting edge plane CEP and cut hair present on the cutting edge plane CEP as the razor cartridge 20 is moved across the cutting edge plane CEP in the shaving direction S.

The particular design of the group of cutting members 29 illustrated in the embodiment of FIG. 6 has been discussed previously in relation to the blade arrangement illustrated in FIG. 4. However, at least the blade arrangements illustrated in FIG. 5 may also be provided as the group of cutting members.

In an example, a razor cartridge 20 is provided with a group of cutting members 29 comprising two cutting members. In an example, a razor cartridge 20 is provided with a group of cutting members 29 comprising three cutting members. In an example, a razor cartridge 20 is provided with a group of cutting members 29 comprising four cutting members. In an example, a razor cartridge 20 is provided with a group of cutting members 29 comprising five cutting members. In an example, a razor cartridge 20 is provided with a group of cutting members 29 comprising six cutting members. In an example, a razor cartridge 20 is provided with a group of cutting members 29 comprising seven or more cutting members.

The group of cutting members 29 defines a plurality of substantially parallel inter-blade spans. The number of inter-blade spans is one fewer than the number of cutting members 28*a-d*.

The housing 21 comprises first 16 and second 18 side portions. The housing 21 may comprise first retainer 26 and second retainer 27 configured to mate resiliently with the respective first 16 and second 18 side portions to confine the cutting members within the razor cartridge 20 housing, although other retaining mechanisms are known to a skilled person and are not excluded. When the razor cartridge 20 is in an assembled state, the first and second side portions 16, 18 are configured to confine the longitudinal ends of the guard member 23, and the cutting members 28*a*-28*d* of the group of cutting members 29. The first retainer 26 and second retainer 27 may comprise, for example, plastic, an elastomer, a resin, a metal or metal alloy material and furthermore may be of a different shape to that illustrated.

The razor cartridge 20 of FIG. 6 further comprises four resilient fingers 38*a*, 38*b*, 38*c*, 38*d* provided in the vicinity of the first retainer 26. The razor cartridge 20 comprises four resilient fingers provided in the vicinity of the second retainer 27 that are in transverse corresponding alignment with the four resilient fingers 38*a*, 38*b*, 38*c*, 38*d* under the first retainer 26. In an example, the resilient fingers 38 are integral with the housing and extend inwardly from the first 16 and second 17 sides.

In total, the eight resilient fingers each exert a bias force against respective cutting members of the group of cutting members 29 in the direction of the cutting edge plane CEP such that the cutting members of the group of cutting members 29 are in a rest position, when the razor cartridge 20 is assembled. In the rest position, the cutting edges 30 of the blades 33, at each lateral end of the blades 33 near the first 26 and second 27 retainers, bear against corresponding stop portions, for example. In an example, the stop portions may be the first 26 and second 27 retainer.

Accordingly, the rest position of the cutting members 28*a-d* is well defined, enabling a high shaving precision. Of course, the illustrated biasing arrangement has many variations. For example, a further plurality of resilient fingers may be provided on one or more of the cross members 35. In a simplified razor cartridge design (such as for low cost, disposable razors), the resilient fingers may be omitted. A skilled person will appreciate that the number of resilient fingers 38 to be provided is related to the number of cutting members 28*a-d* in the group of cutting members 29, and that fewer or more than eight resilient fingers 38 can be provided. It is not essential that the resilient fingers are provided as the skilled person is aware of other mounting means for the cutting members 28.

In examples, no biasing members are provided.

A pivotable bearing member (not shown) may, in an example, be provided on the handle side of the razor cartridge 20 configured to connect to a pivotable handle 2. Such a pivotable bearing member, in an example, comprises two or more shell bearings configured to connect to the pivotable bearing member 8 of the handle 2, although a skilled person is familiar with many attachment mechanisms of a razor cartridge to a handle which are not excluded As illustrated in FIG. 6, the cutting members comprised in the group of cutting members 29 are disposed in the razor cartridge 20 such that two cutting edges 30 comprised, respectively, on the two foremost cutting members 28*a* 28*b* of the group of cutting members 29 (nearest to the leading longitudinal side of the razor cartridge) define a leading inter-blade span 40 that is closest to the leading longitudinal side 24 of the razor cartridge 20. The inter-blade spans are illustrated further in FIG. 10 and discussed subsequently.

Each cutting member in the group of cutting members 29 comprises a longitudinal blade support 32. A longitudinal blade is mounted on the blade support 32. The cutting edge 30 of a cutting member 28*a-d* is oriented forward in the direction of shaving S. The blade support 32 of a cutting member 28*a-d* is an elongated, bent piece of rigid material. In an example, the blade support 32 is a metal such as austenitic stainless steel.

Each cutting member in the group of cutting members 29 is, in an example, resiliently mounted in a blade receiving section 31 of the razor cartridge 20. The blade receiving section 31 comprises a longitudinal space in the razor cartridge 20 that is sized to accommodate the group of cutting members 29. At least one cutting member of the group of cutting members 29, up to all cutting members in the group of cutting members 29 may be resiliently mounted on the resilient fingers 38 in the blade housing 21. In the illustrated example of FIG. 6, the transverse inner sides of housing 21 comprise a plurality of holding slots 34. Each holding slot 34 on the transverse inner sides is configured to accept and retain one side of a blade support 32 of a cutting member of the group of cutting members 29 so that the cutting members of the group of cutting members 29 are held in the blade receiving section 31 with a substantially parallel inter-blade span. Therefore, as many holding slots 34 are provided in each transverse inner side of housing 21 as there are blade support members.

Between the blade receiving section 31 and the handle (in a part adjacent to a handle 2 connection, for example) there are, in examples, provided one or more cross members 35 that are integrally formed with the housing 21. The cross members 35 may comprise a plurality of blade support guides 36 provided as a plurality of protuberances aligned with the holding slot 34 on the transverse inner sides of the housing 21. The blade support guides 36 function to provide an additional support to the blades in a direction parallel and perpendicular to the longitudinal direction, thus increasing the stability during use.

In examples, a razor cartridge 20 according to the first aspect has a variable inter-blade span IBS. Therefore, in one variant, the spacing of the blade supports 32 is progressively decreased between the leading longitudinal side 24 and the trailing longitudinal side 25 of the razor 20 to generate the variable inter-blade span IBS. One alternative way to achieve this arrangement is to progressively decrease the spacing between the holding slots 34 provided on the transverse inner sides in a transverse direction (y to −y) of the razor cartridge. The positioning and/or width of the blade support guides 36 is adjusted commensurately, such that space between the cutting edges 30 of the cutting members 28*a-d* is parallel.

Figure 7A:
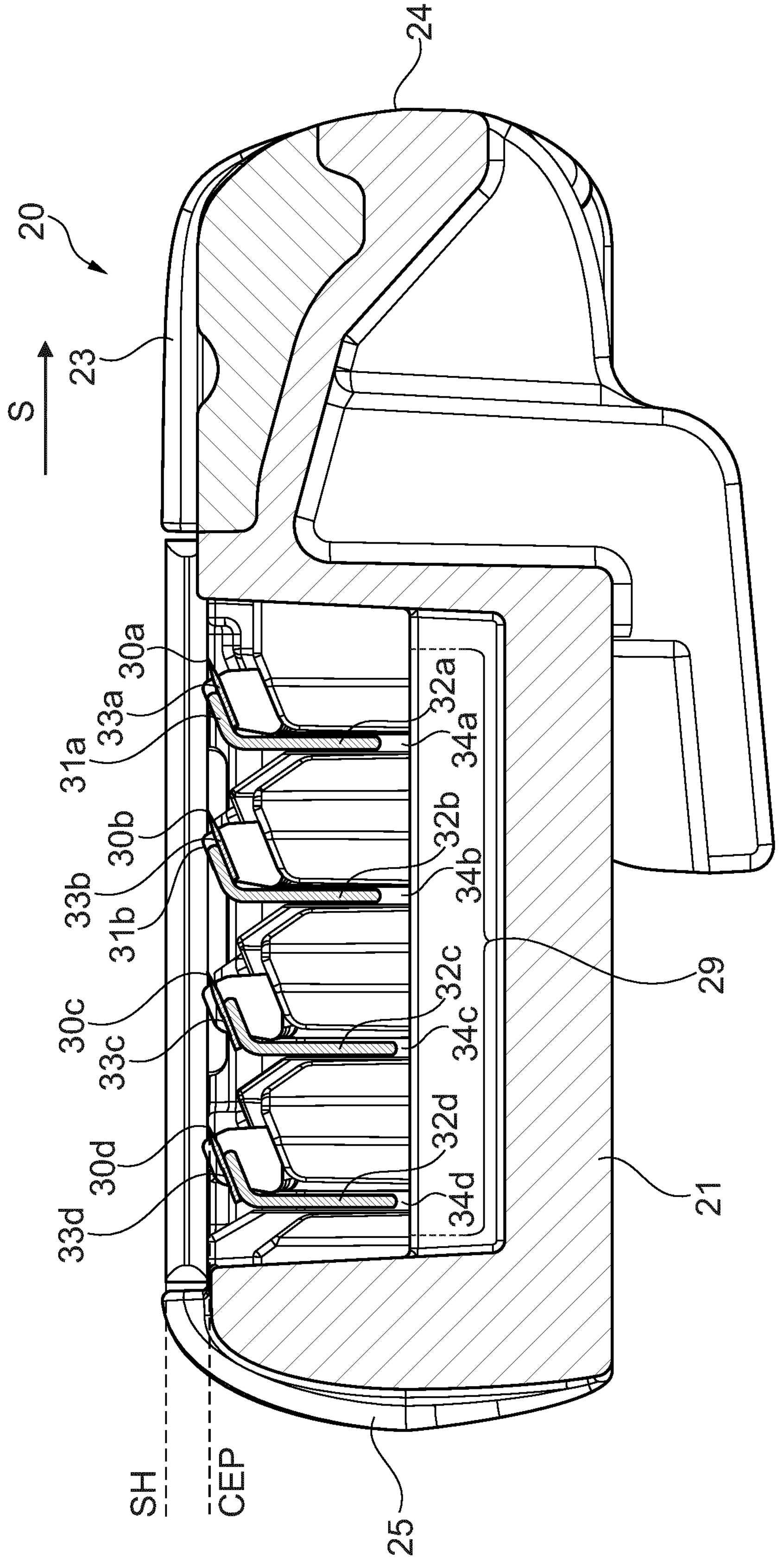
FIG. 7*a* is a schematic cutaway side view of a razor cartridge taken from the aspect of FIG. 6 along axis P-Q.

FIG. 7*a* is a schematic cutaway side view of a razor cartridge taken from the embodiment of FIG. 6 along transverse axis P-Q illustrated by the dotted line in FIG. 6. Where possible, like elements are denoted with like reference numerals.

FIG. 7*a* illustrates a side view of the holding slots 34*a-d* provided razor cartridge 20 for holding the cutting members 28*a-d* of the group of cutting members 29. The plurality of blade support guides 36 and the plurality of resilient fingers 38 shown in FIG. 6 is not shown in the projection of FIG. 7*a* to aid clarity.

FIG. 7*a* illustrates the altered orientation of the blades 33*a*-33*d* in the longitudinal direction the direction from the leading longitudinal side 24 to the trailing longitudinal side 25 of razor cartridge 20.

Of course, the provision of a succession of holding slots 34 in the first 26 and second 27 retainers to support the cutting members of the group of cutting members 29 is not essential. The group of cutting members 29 could also be supported using a plurality of blade support guides 36 (protuberances) positioned on one or more cross members 35, for example, where the plurality of blade support guides 36 provide a progressively decreasing inter-blade span in the longitudinal direction from the leading longitudinal side 24 to the trailing longitudinal side 25 of the razor cartridge 20. In an example, a plurality of blade support guides 36 and a succession of holding slots 34 may be used in combination to provide progressively decreasing span in the longitudinal direction.

Figure 7B:
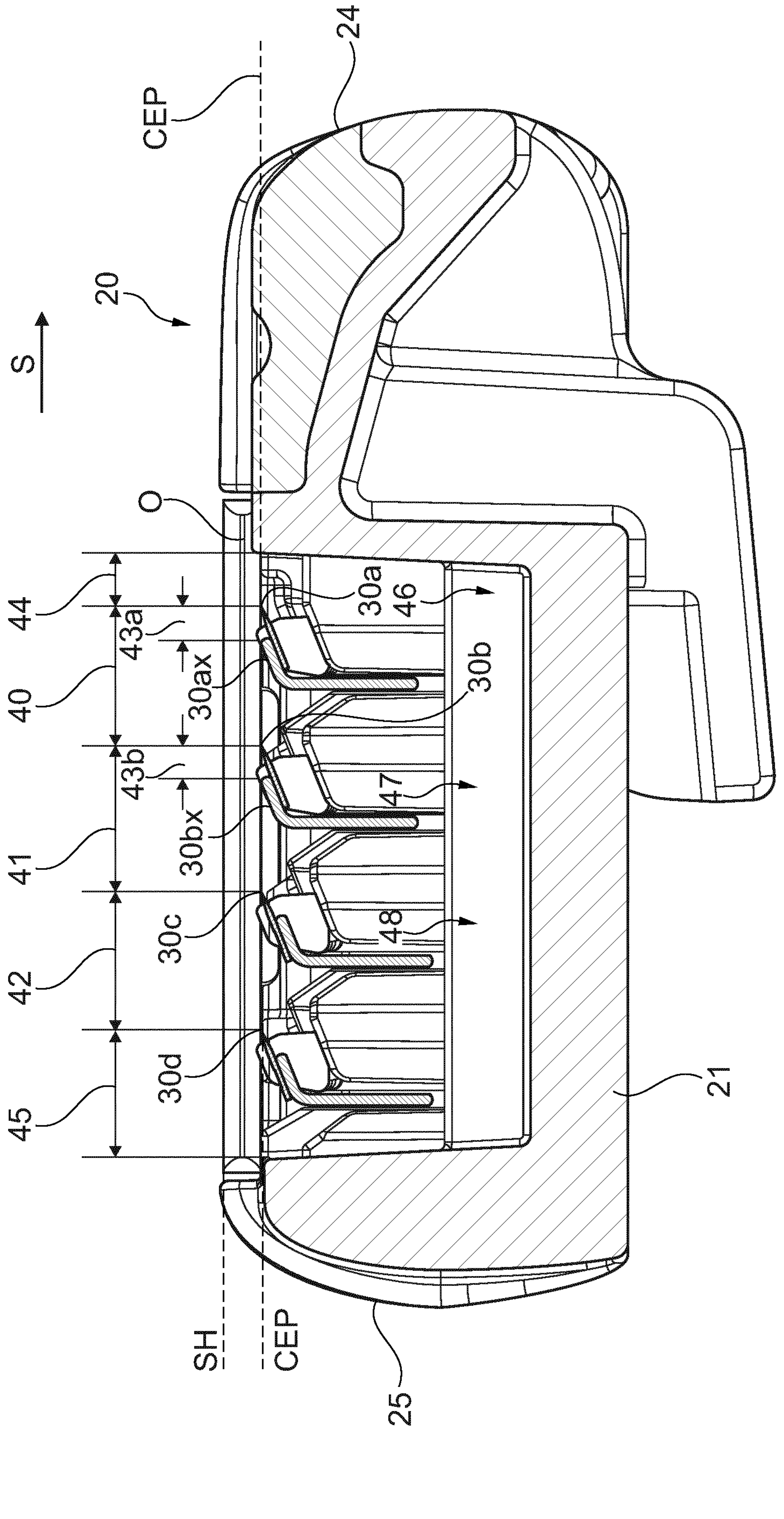
FIG. 7*b* is a duplicate of the schematic cutaway side view of the razor cartridge shown in FIG. 7*a* that has been differently annotated to illustrate the inter-blade spacing.

FIG. 7*b* is a duplicate of the schematic cutaway side view of the razor cartridge 20 shown in FIG. 7*a* that has been annotated to denote inter-blade spacing. The longitudinal line on an internal leading longitudinal wall of the blade receiving section 50 that is closest to the cutting edge plane CEP in use serves as an origin O for the purposes of the present definition.

A leading blade 33*a* to housing 21 span 44 is the transverse span (substantially aligned with the shaving direction S) that is perpendicular to the longitudinal orientation of the blades of the group of cutting members 29 that spans the space between the internal leading longitudinal wall of the blade receiving section 50 that is closest to the cutting edge plane CEP in use (the origin) and the cutting edge 30*a* of the leading blade of the group of cutting members 29.

A leading inter-blade span 40 that is the closest inter-blade span to the leading longitudinal side 24 of the razor cartridge is a transverse span (substantially aligned with the shaving direction S in use) that is substantially perpendicular to the longitudinal orientation of the blades of the group of cutting members 29. The leading inter-blade span 40 begins at a point on cutting edge 30*a* and ends on to a corresponding point on the cutting edge 30*b* of the first intermediate blade 33*b*.

A first intermediate inter-blade span 41 is a transverse span (substantially aligned with the shaving direction S in use) that is substantially perpendicular to the longitudinal orientation of the blades of the group of cutting members 29. The first intermediate inter-blade span 41 begins at a point on cutting edge 30*b* and ends on a corresponding point on the cutting edge 30*c* of the second intermediate blade 33*c*.

A trailing inter-blade span 42 is a transverse span (substantially aligned with the shaving direction S in use) that is perpendicular to the longitudinal orientation of the blades of the group of cutting members 29. The trailing inter-blade span 42 begins at a point on cutting edge 30*c* and ends on a corresponding point on the cutting edge 30*d* of the blade 33*d* that is closest to the trailing longitudinal side 25 of the razor cartridge 20.

A trailing blade to frame span 45 that is a transverse span (substantially aligned with the shaving direction S in use) that is perpendicular to the longitudinal orientation of the blades of the group of cutting members 29 the cutting edge 30*a* and a corresponding point on the internal trailing longitudinal wall of blade receiving section 52.

Thus, the total span of the blade receiving section 31 corresponds to the sum of spans 44, 40, 41, 42, and 45. In practice, the total span of the blade receiving section may be in the range of 7 to 15 mm.

At least one blade mounting portion 70 is disposed on an inner surface 64 of a respective blade support 32 that, in use, faces away from the cutting edge plane CEP. The cutting edge 30 extends forward from the front of the blade support 32. However, the blade support 32 has a non-negligible thickness. For example, the blade support 32 has a thickness in the range 0.12 mm-0.21 mm, and more specifically in the range 0.155 mm-0.185, and most specifically 0.17 mm.

Consequently, a non-negligible span defined as the transverse span (substantially aligned with the shaving direction S in use) that is perpendicular to the longitudinal orientation exists between each cutting edge 30 and the blade-mounting end of each blade support 32 of each cutting member of the group of cutting members 29. This may be referred to as a cutting edge to blade span 43 of a respective cutting member. The edge support span may be derived using trigonometry based on the thickness of the blade support 32 and the tilt angle relative to the cutting edge plane CEP of the blade receiving section 31 of the blade support 32.

In an example, each blade support 32 of the group of cutting members 29 is identical and has the same thickness T2 and the same tilt angle A. In this case, the cutting edge to blade span 43*a* or 43*b* are identical.

In an example, one or more of the cutting edge to blade spans 43*a* or 43*b* are in the range 0.3 mm to 0.6 mm, and specifically 0.5 mm.

In an example, at least one blade support 32 of the group of cutting members 29 has a different thickness and/or tilt angle to the remainder of the blade supports 32. In this case, at least one cutting edge to blade span 43*a* will differ from the remainder. An effect is that individual cutting edge to blade spans 43*a* or 43*b* may be individually tuned to provide further fine control over skin bulge effects. For example, the cutting edge to blade span 43*a* or 43*b* may be designed to progressively increase or decrease.

A leading blade to frame span 44 is a transverse span (substantially aligned with the shaving direction S in use) that is perpendicular to the longitudinal orientation of the blades of the group of cutting members 29. The leading blade to frame span begins at a point on the internal leading longitudinal wall 50 that is, in an example, closest to the cutting edge plane CEP. The leading blade to frame span ends at a corresponding point on the cutting edge 30*a* of the blade 33 of the leading cutting member 28*a* that is in an example, closest to the cutting edge plane CEP.

In an example the leading frame to blade span 44 is 0.5 mm to 0.9 mm, and specifically 0.7 mm.

A trailing blade to frame span 45 is a transverse span (substantially aligned with the shaving direction S in use) that is perpendicular to the longitudinal orientation of the blades of the group of cutting members 29. The following blade to frame span begins at a point on the cutting edge 30*d* of the blade 33*d* of the trailing cutting member 28*d*. The trailing blade to frame span 45 ends at a corresponding point on the internal trailing longitudinal wall 52 that is, in an example, closest to the cutting edge plane CEP.

In an example, the trailing frame to blade span 45 is 1.6 mm to 2.0 mm, and specifically 1.8 mm. In an example, the leading blade to frame span 44 is greater than the trailing blade to frame span 45. In an example, the leading blade to frame span 44 is smaller than the trailing blade to frame span 45. In an example, the leading blade to frame span 44 is substantially equal to than the trailing blade to frame span 45. In an example, the leading blade to frame span 44 is greater than the leading inter-blade span 40. In an example, the leading blade to frame span 44 is substantially equal to than the leading inter-blade span 40. In an example, the leading blade to frame span 44 is smaller than to the leading inter-blade span 40. In an example, the trailing blade to frame span 45 is greater than the trailing inter-blade span 42. In an example, the trailing blade to frame span 45 is substantially equal to the trailing inter-blade span 42. In an example, the trailing blade to frame span 45 is smaller than the trailing inter-blade span 42. In an example, the first intermediate inter-blade span 41 and the second intermediate inter-blade span 42 are each substantially equal to the leading inter-blade span 40. In an example, the first intermediate inter-blade span 41 and the second intermediate inter-blade span are each substantially equal to the trailing inter-blade span 42. In an example, the first intermediate inter-blade span 41 is less than the leading inter-blade span 41 and greater than the second intermediate inter-blade span. In an example, the second intermediate inter-blade span is equal to the trailing inter-blade span 42. In an example, a leading inter-blade span that is closest to the leading longitudinal side of the razor cartridge is greater than a trailing inter-blade span that is closest to the trailing longitudinal side of the razor cartridge.

Specific measurements of the separation distance ranges inter-blade spans will now be discussed. A skilled person will appreciate that many choices and combinations of inter-blade spans may be used.

In an example, the leading inter blade span 40 is within a range of 1.6 mm to 2.2 mm, 1.70 mm to 2 mm, or 1.75 mm to 1.95 mm.

When three cutting members 28*a-c* are present, the leading inter blade spans defined above may still apply, in combination with a trailing inter-blade span 42 in a range of 1.6 mm to 2.2 mm, 1.70 mm to 2.00 mm, or within 1.75 mm to 1.95 mm.

When four cutting members 28*a-d* are present, the trailing inter-blade span 42 is in a range of 1.6 mm to 2.2 mm, 1.70 mm to 2.00 mm, or within 1.75 mm to 1.95 mm.

In an example, the leading inter blade span 40 is within a range of 1.7 mm to 2.2 mm, 1.8 mm to 2.0 mm, or is 1.85 mm.

In an example, the first intermediate inter blade span 41 is within a range of 1.55 mm to 1.95 mm, 1.60 mm to 1.80 mm, or is 1.70 mm.

In an example, the trailing inter-blade span 42 is within a range of 1.4 mm to 1.8 mm, specifically 1.50 mm to 1.65 mm, or is 1.55 mm.

In an example, the leading blade to frame span 44 is within a range of 0.4-1.0 mm, 0.5 mm to 0.8 mm, or is 0.7 mm.

In an example, the trailing blade to frame span 45 is within a range of 1.7 mm to 2.2 mm, 1.8 mm to 2.0 mm, or is 1.85 mm.

However, any possibly combination of inter-blade spans is possible, provided a leading inter-blade span that is closest to the leading longitudinal side 24 of the razor cartridge is greater than a trailing inter-blade span that is closest to the trailing longitudinal side 25 of the razor cartridge.

The ranges discussed above are generally increased as compared to conventional razor cartridges. The rinsability of a cartridge as discussed herein is generally improved, because more space is available between the cutting members 28*a-d* for debris to flow off closer to the leading edge of the razor cartridge 20. The size of skin bulges is also reduced, resulting in an improved shaving performance.

According to an embodiment in which the leading inter blade span 40 is larger compared to the first intermediate inter blade span 41 or the trailing inter-blade span 42, the first two blades that cut the highest amount of hair are far enough apart to ensure that the debris can be removed easily. The remainder of the blades may have a narrower IBS to reduce the risk of nicks and cuts.

In examples, the leading inter-blade span is in the range 1.70 mm to 2.20 mm, more specifically from 1.80 mm to 2.00 mm, and most specifically 1.85 mm.

In examples, the trailing inter-blade span is in the range 0.9 mm to 1.6 mm, more specifically from 1.0 mm to 1.5 mm, and most specifically 1.05 or 1.30 mm.

FIG. 7*b* also illustrates a first debris run-off portion 46, a second debris run-off portion 47, and a third debris run-off portion 48. The width of the debris run-off portions is defined by the relative spacing of the cutting members of the group of cutting members 29. As illustrated, the first debris run-off portion 46 is wider than the second debris run-off portion 47, which in turn is wider than the third debris run-off portion 48. An effect of this is that, in use, a greater amount of hair clippings and foam can be removed via the first (relatively wider) debris run-off portion 46. This reduces the risk of blockage of the debris run-off portions, particularly when the razor cartridge is used by infrequent shaver users, because the most troublesome debris can escape via the first (relatively wider) debris run-off portion 46.

Design of the size of the leading blade to frame span 44 and/or the trailing blade to frame span 45 may be foreseen. The leading blade to frame span 44 may be larger than, equal to, or smaller than the leading inter-blade span 40. The trailing blade to frame span 45 may be larger than, equal to, or smaller than the trailing inter-blade span 42.

The leading inter-blade span 40 is greater than the trailing inter-blade span 42.

In an example, the first intermediate inter-blade span is equal to, or less than, the leading inter-blade span.

In an example, the first intermediate inter-blade span is equal to, or greater than, the trailing inter-blade span.

A skilled person will appreciate that any disclosed arrangement of inter-blade spans may be combined with any permutation of the blade arrangements (facing towards the shaving plane, or facing away from the shaving plane) illustrated in FIG. 5.

Although a razor cartridge with four blades 33*a-d* has been illustrated, the present specification also includes a razor cartridge comprising three blades, or greater than four blades.

For example, five substantially parallel cutting members 28 may be disposed in a shaving direction of the razor cartridge 20, wherein a second intermediate inter-blade span is defined adjacent to the trailing inter-blade span 42.

In an example, consecutive inter-blade spans of the razor cartridge successively decrease between the leading longitudinal side 24 and the trailing longitudinal side 25 of the razor cartridge in the shaving direction.

Figure 8:
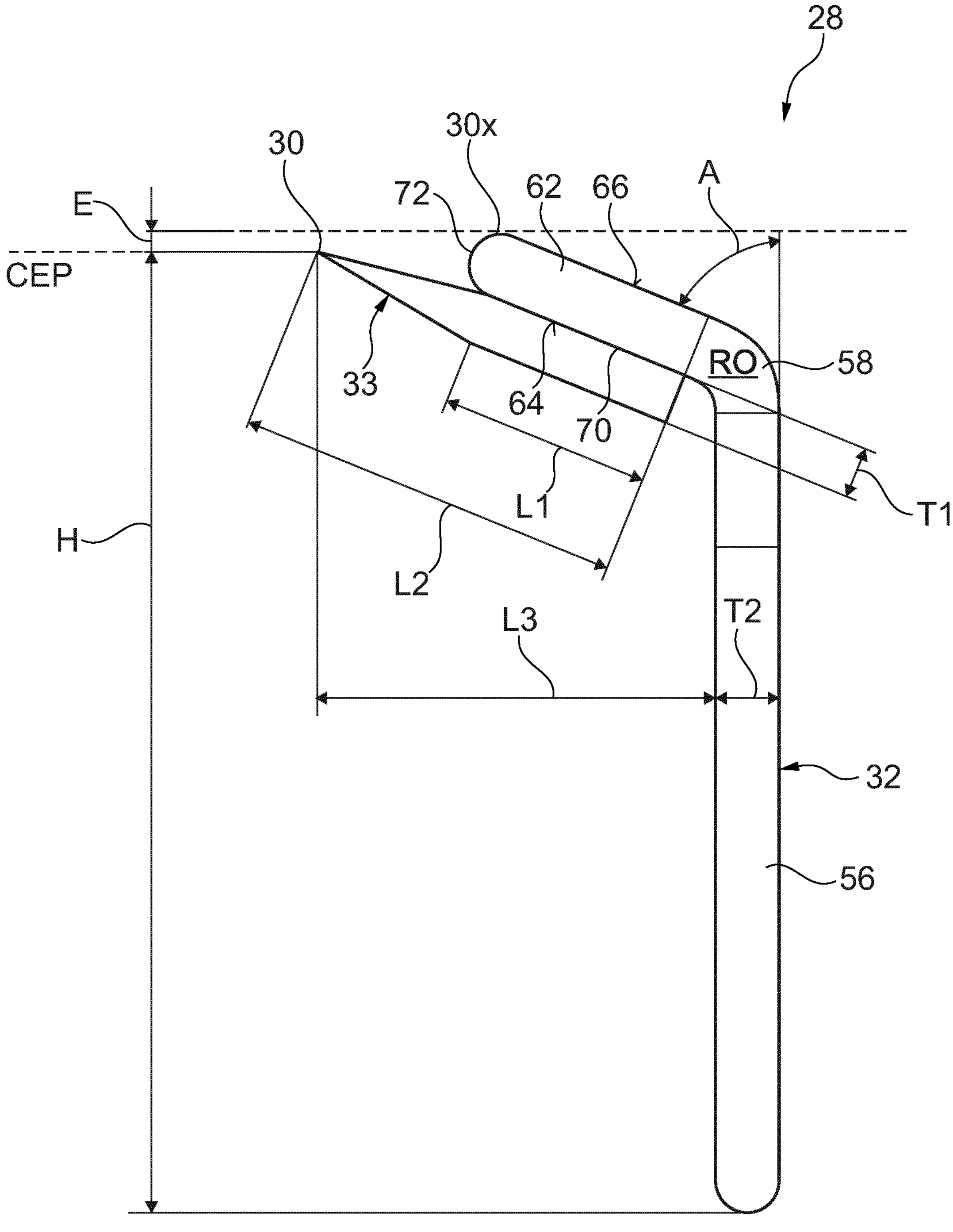
FIG. 8 is a schematic side view of a cutting member comprising a blade mounting portion disposed on an inner surface of the respective blade support that, in use, faces away from a shaving plane.

Turning briefly to FIG. 8, the approach angle A defines the angle of declination of the inner surface of the blade support 64 from the reference of the blade support 32. In an example, A is an acute angle, specifically between 60 and 75 degrees, more specifically 68 degrees.

The longitudinal blade 33 comprises a cutting edge 30 capable of cutting hairs. In an example, a rounded indent is cut from the sheet metal forming the blade support 32.

A conventional blade support (not illustrated) provides a blade mounted on the outer surface of the blade support, such that in use, no part of the blade support comes into contact with cutting edge plane CEP.

Notably, in the present aspects and embodiments, at least one cutting member 28 of the group of cutting members 29 comprises a blade mounting portion 70 of the blade support 32 disposed on an inner surface of the respective blade support 28 that, in use, faces away from a shaving plane SH, and a blade attached to the blade mounting portion 70.

According to the present approach, at least one blade 33 is mounted on an inner surface 64 of the respective blade support and projects from underneath the inner surface defining a cutting edge to blade span 43 between a cutting edge 30 of the blade and the end of the blade support 32 towards the shaving plane SH. In use, as the cutting member 28 contacts and is moved across skin at the cutting edge plane CEP, both the cutting edge of the blade 30 and the end of the blade support 32 contact the skin at the cutting edge plane CEP simultaneously, leading to a reduction in the force exerted on the skin at the cutting edge plane CEP compared to that exerted by a single cutting edge, for example.

In other words, the position of a blade 33 on a blade support 32 when a cutting member 28*a-d* is mounted in the razor cartridge is defined by the fact that an imaginary tangent provided from the surface of the blade 33 that is directed away from the shaving plane SH does not pass through any point of the blade support 32 that the blade 33 is mounted on.

A further definition of the position of a blade 33 on the blade support is that when a cutting member 28*a-d* is mounted in the razor cartridge, an imaginary tangent provided from the portion of the blade 33 in contact with the blade mounting portion 70 that is directed towards the shaving plane SH in use passes through the blade support 32 that the blade 33 is mounted on.

FIG. 8 is a schematic side view of a cutting member 28 comprising a blade mounting portion 70 disposed on an inner surface of a blade support that, in use, faces away from a shaving plane SH.

A longitudinal blade support member (in other words a cutting member 28 without the blade 33 attached) comprises a substantially elongated flat lower portion 56, a substantially elongated flat top side 62, and a radius bend portion 58. The radius bend portion 58 may have an inner radius of curvature RO that is more than 0.1 mm. The radius bend portion 58 may have an inner radius of curvature RO that is less than 0.9 mm. A minimum recommended inner radius of curvature RO of sheet metal should be at least the same as its thickness T. A safety factor of the thickness of the blade support 32 may be applied. By multiplying the safety factor with the thickness of T (e.g. around 0.17 mm), the radius of curvature RO may be approximately 0.25 mm, specifically between 0.16 mm and 0.40 mm, and most specifically between 0.25 mm or 0.28 mm.

As discussed, the blade support 32 may be made from a flat sheet metal part which is bent before welding of the blade 33 on the inner surface 64 of the blade support 32. The cutting member 28 thus comprises a blade 33 (razor blade).

The blade 33 has, in its flat portion, a thickness T1 about 0.1 mm (for example, between 0.04 and 0.11 mm). The total length L2 of the blade 33 between the cutting edge 30 of the blade 33 and the opposite back edge of the blade 33 is about 1 mm (for example, between 0.8 mm and 1.3 mm). The portion of the blade 33 that is in contact with the inner surface 64 of a blade support that, in use, faces away from a shaving plane SH has a length L1 that is about 0.49 mm +/−0.1 mm long. In this way, a good retention of the blade on the underside of the blade support 32 (the inner surface of the blade support 32) is ensured.

In an example, the height H of the cutting member 28 is between 2.53 mm and 2.63 mm, specifically 2.58 mm.

In an example, the rounded front end 72 (providing skin contact portion 30*ax*) of the blade support is rounded or chamfered to improve glideness properties of the cutting member.

In an example, the blade 33 may be positioned on the inner surface 64 of the blade support 32 to adjust the local exposure E of the cutting edge plane CEP positively or negatively compared to a support plane intersecting the front edges of the blade supports 30*ax*, 30*bx*. The local exposure is a measure of how prominently the cutting edge 30 of a blade protrudes above or sinks below the support plane intersecting with rounded front end 72 of its blade support.

In an example, the blade 33 may be positioned to have an exposure E relative to the support plane of the front edge of the blade support 30*x* in the range −80 um to +80 um, more specifically an exposure of about −75 um, −65 um, −60 um, −55 um, −50 um, −45 um, −40 um, −35 um, −30 um, −25 um, −20 um, −15 um, −10 um, −5 um, 0 um, 5 um, 10 um, 15 um, 20 um, 25 um, 30 um, 35 um, 40 um, 45 um, 50 um, 55 um, 60 um, 65 um, 70 um, or 75 um.

The length L3 of the cutting member 28, between the cutting edge 30 and the outer face of the lower portion of the blade support 32 is about 1.0 mm (for example, between 0.9 mm and 1.6 mm).

For blades positioned above their blade support (such as 33*c*, 33*d*), the exposure may range from −50 to 50 um, measured relative to the shaving plane SH.

The blade 33 is fixed on the inner surface 64 of the blade support by any known means, such as by laser spot welding. Specifically, the blade 33 is fixed on the inner surface 64 of the blade support by a plurality of spot welds (for example, between ten and sixteen spot welds) distributed along the longitudinal dimension of the blade support 32. Each of the spot welds may be performed on the inner face 68 of blade 33. Alternatively or in addition, each of the spot welds may be carried out on the outer surface of the blade support 66, or a mixture of the two.

Figure 9:
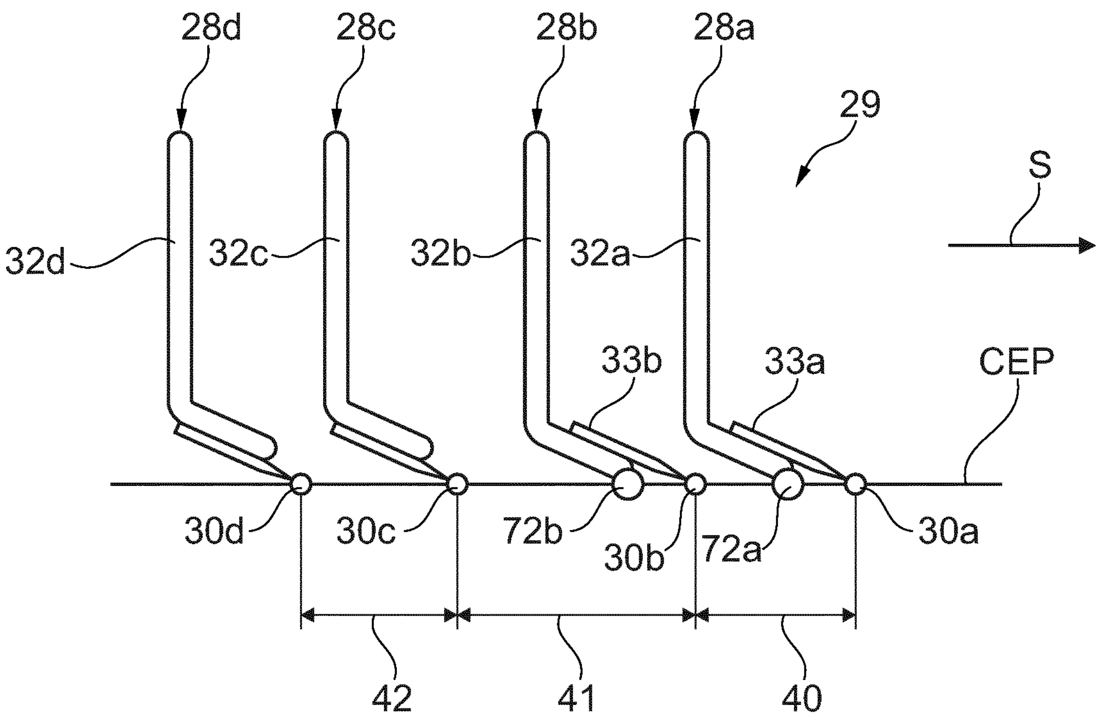
FIG. 9 illustrates a further side view of a blade arrangement illustrating the benefit of enabling at least one of the blade support members to contact the skin.
Figure 10:
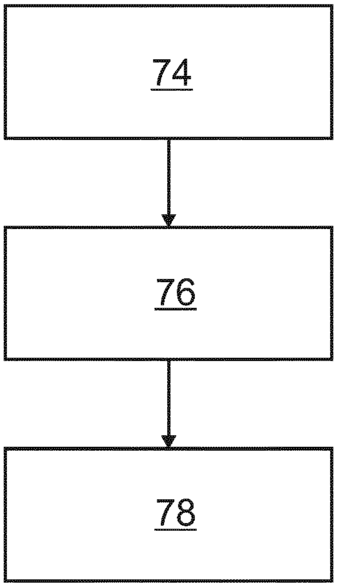
FIG. 10 schematically illustrates a method according to an aspect.

FIG. 9 illustrates an example schematic side view of a group of cutting members 29 in accordance with one exemplary implementation. Four razor blades of the razor cartridge 20 are provided according to this embodiment. FIG. 10 illustrates that the cutting members 28*a* and 28*b* have blades 33*a* and 33*b* mounted to face away from the shaving plane SH, and cutting members 28*c* and 28*d* with blades 33*c* and 33*d* mounted to face towards the shaving plane SH.

In FIG. 9, cutting members 28*a* and 28*b* have four skin contact portions (cutting edges 30*a* and 30*b*, and rounded front ends of blade supports 72*a* and 72*b*). Cutting members 28*c* and 28*d* have skin contact portions provided at cutting edges 30*c* and 30*d*.

Therefore, a safer shaving experience is provided with a reduced number of nicks and irritation. Providing the blade support "on top" of the blade provides an additional skin-contacting element (as well as the cutting edges 30 of the blades) which supports the skin during shaving.

FIG. 10 schematically illustrates a method of manufacturing a razor cartridge according to a second aspect.

The method comprises:

- obtaining housing extending longitudinally along a longitudinal axis, wherein the housing comprises a leading longitudinal side, a trailing longitudinal side, and a recess in between the leading and trailing longitudinal sides for accommodating a group of cutting members;
- providing a first cutting member in the recess, wherein a first cutting member of the group of cutting members comprises a first blade support having a blade mounting portion disposed on an inner surface of the first blade support that, in use, faces away from a shaving plane, and a blade attached to the first blade mounting portion; and
- providing a second cutting member in the recess, wherein the second cutting member of the group of cutting members comprises a second blade support having a second blade mounting portion disposed on an outer surface of the second blade support that, in use, faces towards a shaving plane, and a second blade attached to the second blade mounting portion, thereby providing a group of cutting members disposed at least partially in the recess, wherein each cutting member is arranged between a leading longitudinal side and a trailing longitudinal side of the recess in a shaving direction of the razor cartridge.

FIG. 1 illustrates a shaving razor assembly 1 according to a third aspect. The shaving razor assembly 1 comprises a razor handle 2 and a razor cartridge 20 according to the first aspect or one of its embodiments, wherein the razor cartridge is either releasably attached to the razor handle via a pivotable 8 or non-pivotable connection, integrally formed with the razor handle via a non-pivotable connection, or integrally formed with the razor handle via a pivotable connection.

According to a fourth aspect, there is provided a kit of parts comprising a razor handle 2 and a razor cartridge holder comprising a plurality of razor cartridges razor cartridge 20 according to the first aspect or its embodiments.

In the preceding specification, numerous specific details are set forth in order to provide a thorough understanding. It will be apparent, however, to one having ordinary skill in the art that the specific detail need not be employed to practice the present disclosure. In other instances, well-known materials or methods have not been described in detail in order to avoid obscuring the present disclosure.

Reference throughout the preceding specification to "one embodiment", "an embodiment", "one example" or "an example", "one aspect" or "an aspect" means that a particular feature, structure or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

| REFERENCE NUMERALS | |
|---|---|
| S | Shaving direction |
| SH | Shaving plane |
| CEP | Cutting edge plane |
| L | Longitudinal direction |
| IBS | inter blade span |
| RO | inner radius of curvature |
| T1 | Razor blade thickness |
| T2 | Blade support thickness |
| h | cutting member height deviation |
| IP | extended line |
| 1 | Shaving razor assembly |
| 2 | Handle |
| 4 | proximal portions |
| 5a, 5b | release mechanism |
| 6 | distal portion |
| 7 | thumb rest |
| 8 | pivotable bearing member |
| 9 | handle grips |
| 12 | bulging |
| 14 | skin contact point |
| 16 | first side portion |
| 18 | second side portion |
| 19 | recess |
| 20 | razor cartridge |
| 21 | housing |
| 22 | platform member |
| 23 | guard member |
| 24 | leading longitudinal side |
| 25 | trailing longitudinal side |
| 26 | first retainer |

-continued

| REFERENCE NUMERALS | |
|---|---|
| 27 | second retainer |
| 28a-d | cutting member |
| 29 | group of cutting members |
| 30a-d | cutting edge |
| 30ax | front edge of first blade support |
| 30bx | front edge of second blade support |
| 31a-d | blade receiving section |
| 32 | blade support |
| 33a-d | blade |
| 34a-d | holding slots |
| 35 | cross member |
| 36 | blade support guide |
| 38a-d | resilient finger |
| 40 | leading inter blade span |
| 41 | first intermediate inter blade span |
| 42 | trailing inter-blade span |
| 43a-d | cutting edge to blade span |
| 44 | leading blade to frame span |
| 45 | trailing blade to frame span |
| 46 | first debris run-off portion |
| 47 | second debris run-off portion |
| 48 | third debris run-off portion |
| 50 | internal leading longitudinal wall of blade receiving section 31 |
| 52 | internal trailing longitudinal wall of blade receiving section 31 |
| 54 | cutting edge plane contact portion |
| 56 | lower portion of blade support |
| 58 | radius bend portion |
| 62 | top side of blade support member |
| 64 | inner surface of blade support |
| 66 | outer surface of blade support |
| 68 | inner face of blade |
| 70 | blade mounting portion |
| 72 | rounded front end of blade support |
| 74 | obtaining a razor cartridge housing and three or more cutting members... |
| 76 | disposing the three or more cutting members . . . |

The invention claimed is:

1. A razor cartridge comprising:

a housing extending longitudinally along a longitudinal axis from a first side portion to a second side portion, wherein the housing comprises a leading longitudinal side, a trailing longitudinal side, and a recess in between the leading longitudinal side and the trailing longitudinal side for accommodating a plurality of cutting members, wherein the housing comprises a plurality of resilient fingers extending from the first side portion and the second side portion along the longitudinal axis, and wherein the housing comprises one or more cross members extending between the leading longitudinal side and the trailing longitudinal side perpendicularly to the longitudinal axis, each of the one or more cross members including a plurality of blade support guides; and a group of cutting members comprising the plurality of cutting members disposed at least partially in the recess, wherein each cutting member is arranged between a leading longitudinal side and a trailing longitudinal side of the recess in a shaving direction of the razor cartridge, wherein the plurality of resilient fingers bias the group of cutting members, and wherein the group of cutting members are supported and positioned by the plurality of blade support guides;

wherein a first cutting member of the group of cutting members comprises a first blade support having a first blade mounting portion disposed on an inner surface of the first blade support that, in use, faces away from a shaving plane, and a first blade with a first cutting edge attached to the first blade mounting portion;

wherein a second cutting member of the group of cutting members comprises a second blade support having a second blade mounting portion disposed on an outer surface of the second blade support that, in use, faces towards the shaving plane, and a second blade with a second cutting edge attached to the second blade mounting portion;

wherein a third cutting member of the group of cutting members comprises a third blade support having a third blade mounting portion disposed on an inner surface of the third blade support that, in use, faces away from the shaving plane, and a third blade with a third cutting edge attached to the third blade mounting portion;

wherein the first cutting member and the third cutting member include a first cutting edge plane contact portion on the first blade support and a third cutting edge plane contact portion on the third blade support, respectively, and wherein the first cutting edge, the first cutting edge plane contact portion, the second cutting edge, the third cutting edge, and the third cutting edge plane contact portion intersect tangentially with a cutting edge plane; and wherein the first blade support the second blade support, and the third blade support have the same dimensions.

2. The razor cartridge according to claim 1, wherein the group of cutting members comprises a first subset comprising the first cutting member; and wherein the group of cutting members comprises a second subset comprising the second cutting member; and wherein the first subset of the group of cutting members is disposed closer to the leading longitudinal side of the recess than the second subset, and wherein the second subset of the group of cutting members is disposed closer to the trailing longitudinal side of the recess compared to the first subset.

3. The razor cartridge according to claim 1, wherein in use, an integer number of skin contact points of cutting members comprised within the group of cutting members is at least one greater than a total integer number of cutting members comprised within the group of cutting members, and the integer number of skin contact points is at least one fewer than two times the total integer number of cutting members comprised within the group of cutting members.

4. The razor cartridge according to claim 1, wherein a subset of the group of cutting members comprises two consecutive cutting members, each cutting member comprising a blade support having a blade mounting portion disposed on an inner surface of the blade support that, in use, faces away from the shaving plane and a blade attached to the blade mounting portion.

5. The razor cartridge according to claim 1, wherein a subset of the group of cutting members comprises three consecutive cutting members, each cutting member comprising a blade support having a blade mounting portion disposed on an inner surface of the blade support that, in use, faces away from the shaving plane and a blade attached to the blade mounting portion.

6. The razor cartridge according to claim 1, wherein a subset of the group of cutting members comprises three consecutive cutting members, each cutting member comprising a blade support having a blade mounting portion on an outer surface of the blade support that, in use, faces towards the shaving plane and a blade attached to the blade mounting portion.

7. The razor cartridge according to claim 1, wherein cutting members of the group of cutting members are disposed to define a plurality of inter-blade spans between cutting edges of the cutting members; and wherein the plurality of blade support guides provide a progressively decreasing inter-blade span along the longitudinal axis from the leading longitudinal side to the trailing longitudinal side.

8. The razor cartridge according to claim 7, wherein a leading inter-blade span that is closer to the leading longitudinal side of the razor cartridge than a trailing inter-blade span is in a range from 1.70 mm to 2.20 mm.

9. The razor cartridge according to claim 8, wherein the leading inter-blade span is in a range from 1.80 mm to 2.00 mm.

10. The razor cartridge according to claim 8, wherein the leading inter-blade span is 1.85 mm.

11. The razor cartridge according to claim 7, wherein a trailing inter-blade span that is closer to the trailing longitudinal side of the razor cartridge than a leading inter-blade span is in a range from 0.9 mm to 1.6 mm.

12. The razor cartridge according to claim 11, wherein the trailing inter-blade span is in a range from 1.0 mm to 1.5 mm.

13. The razor cartridge according to claim 11, wherein the trailing inter-blade span is 1.05 mm or 1.30 mm.

14. The razor cartridge according to claim 1, wherein the housing comprises a plurality of holding slots, each holding slot configured to retain one cutting member of the group of cutting members, wherein cutting members of the group of cutting members are disposed to define a plurality of inter-blade spans between cutting edges of the cutting members; and wherein the plurality of blade support guides and the plurality of holding slots provide a progressively decreasing inter-blade span along the longitudinal axis from the leading longitudinal side to the trailing longitudinal side.

15. A shaving razor assembly comprising:

a razor handle;

a razor cartridge according to claim 1, wherein the razor cartridge is either releasably attached to the razor handle via a pivotable connection, releasably attached to the razor handle via a non-pivotable connection, integrally formed with the razor handle via a non-pivotable connection, or integrally formed with the razor handle via a pivotable connection.

16. A kit of parts comprising:

a razor handle; and a razor cartridge holder comprising a plurality of razor cartridges according to claim 1.

17. The razor cartridge according to claim 1, wherein a distance between the first cutting edge and the second cutting edge is defined as a first inter-blade span, wherein a distance between the second cutting edge and the third cutting edge is defined as a second inter-blade span, and wherein the first inter-blade span is greater than the second inter-blade span.

18. The razor cartridge according to claim 17, wherein the first inter-blade span is in a range from 1.80 mm to 2.00 mm, and the second inter-blade span is in a range from 1.0 mm to 1.5 mm.

* * * * *